(12) United States Patent
Payne et al.

(10) Patent No.: US 6,760,135 B1
(45) Date of Patent: Jul. 6, 2004

(54) HOLOGRAPHIC DISPLAYS

(75) Inventors: Douglas Payne, Worcestershire (GB); Christophe W. Slinger, Worcestershire (GB)

(73) Assignee: Holographic Imaging LLC, Birmingham, MI (US)

( * ) Notice: Subject to any disclaimer, the term of this patent is extended or adjusted under 35 U.S.C. 154(b) by 0 days.

(21) Appl. No.: 09/926,734

(22) PCT Filed: May 18, 2000

(86) PCT No.: PCT/GB00/01903

§ 371 (c)(1),
(2), (4) Date: Mar. 18, 2002

(87) PCT Pub. No.: WO00/75699

PCT Pub. Date: Dec. 14, 2000

(30) Foreign Application Priority Data

Jun. 9, 1999 (GB) .............................. 9913432

(51) Int. Cl.[7] .............................................. G02B 26/10
(52) U.S. Cl. .............................. 359/15; 359/22; 359/32; 349/24
(58) Field of Search ................... 349/74, 24; 359/15, 359/22, 9, 32, 33, 25, 24; 348/40, 41

(56) References Cited

U.S. PATENT DOCUMENTS

| 5,132,839 | A | * | 7/1992 | Travis | ....................... 359/462 |
| 5,138,471 | A | | 8/1992 | McGrew | |
| 5,172,251 | A | | 12/1992 | Benton et al. | |
| 5,652,666 | A | | 7/1997 | Rester et al. | |

FOREIGN PATENT DOCUMENTS

GB  2 330 471 A  4/1999

* cited by examiner

Primary Examiner—Drew A. Dunn
Assistant Examiner—Fayez Assaf
(74) Attorney, Agent, or Firm—Arent Fox

(57) ABSTRACT

A holographic display comprises a source of coherent light and an Electrically Addressable Spatial Light Modulator (EASLM) in the path of the light source. The EASLM is arranged in use to be driven successively by a set of sub-holograms which together correspond to a holographic image. Light guiding means is arranged to guide light output from the EASLM such that the sub-holograms are displayed successively in respective tiled regions of an EASLM projection surface.

11 Claims, 6 Drawing Sheets

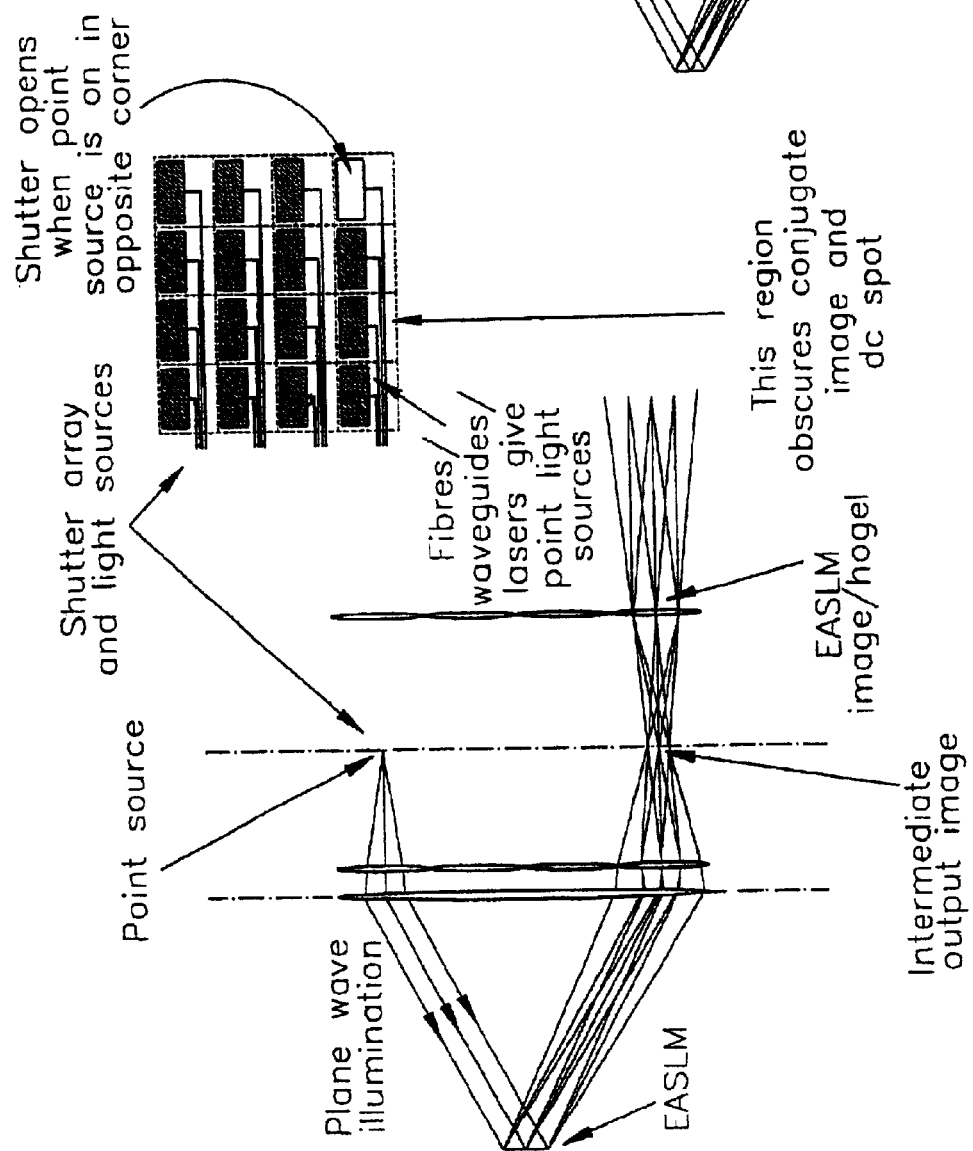

Co-planar array
EASLM images

Large optic with highly
angled surface needed to bend
rays in towards image

HOLOGRAPHIC DISPLAYS

The present invention relates to holographic displays and in particular to holographic displays which use an electrically addressable spatial light modulator to generate modulated light for projection onto an optically addressable spatial light modulator.

It is well known that a three-dimensional image may be presented by forming an interference pattern or hologram on a planer surface. The three-dimensional image is visible when the hologram is appropriately illuminated. Recently, interest has grown in so-called computer generated holograms (CGHs) which offer the possibility of displaying high quality images, which need not be based upon real objects, with appropriate depth cues and without the need for viewing goggles. Interest is perhaps most intense in the medical and design fields where the need for realistic visualisation techniques is great.

Typically, a computer generated hologram involves the generation of a matrix of data values (each data value corresponding to a light transmission level) which simulates the hologram which, might otherwise be formed on a real planer surface. The matrix is applied to an Electrically Addressable Spatial Light Modulator (EASLM) which may be, for example, a two-dimensional array of liquid crystal elements or of acousto-optic modulators. Coherent light is directed onto the EASLM using for example a laser such that the resulting output, either reflected from the EASLM or transmitted through the EASLM, is a modulated light pattern.

In order to produce a three-dimensional image of usable size and viewing angle, the EASLM typically has to have a large number of pixels, e.g. $10^{10}$. In addition, the pixels of the EASLM must be positioned relative to one another with a high degree of accuracy. The device must also be capable of modulating coherent light, e.g. produced by a laser. These requirements are extremely demanding and expensive to achieve in practice.

An alternative approach is presented in GB2330471A and is illustrated schematically in FIG. 1. This document describes a holographic display technique, which is referred to as Active Tiling™, and involves the use of a relatively small EASLM 1 in combination with a relatively large Optically Addressable Spatial Light Modulator (OASLM) 2. The holographic matrix is subdivided into a set of sub-holograms, with the data for each sub-hologram being passed in turn to the EASLM 1. The EASLM 1 is illuminated from one side with incoherent light 3. The OASLM 2 comprises a sheet of bistable liquid crystal (in one example the liquid crystal is a ferroelectric liquid crystal) which is switched from a first to a second state by incident light. Guide optics 4, disposed between the EASLM 1 and the OASLM 2, cause the output of the EASLM 1 (i.e. light transmitted through the EASLM 1) to be stepped across the surface of the OASLM 2. The bistable nature of the OASLM liquid crystal means that the portion or "tile" 5 of the OASLM 2 onto which a sub-holographic image is projected, remembers that image until such time as the OASLM is reset by the application of an electrical voltage. It will be appreciated that, providing a reset voltage is applied only at the end of a complete scan, immediately prior to reset the OASLM 2 will have "stored" in it a replica of the complete holographic matrix. The holographic display also typically comprises a large output lens, although this is not shown in FIG. 1.

The need for an OASLM 2 in the display of GB2330471A is demanding and expensive to implement in practice. Furthermore, the need for the OASLM to have memory and for it to be reset at the end of each scan, requiring as it does the use of surface electrodes, adds complexity and therefore yet more expense to the holographic display.

It is an object of the present invention to overcome or at least mitigate the above noted disadvantages. This and other objects are achieved at least in part by providing a holographic display having an EASLM which is illuminated with coherent light and which is used to display sub-holographic images.

According to a first aspect of the present invention there is provided a holographic display comprising:

a source of coherent light;

an Electrically Addressable Spatial Light Modulator (EASLM) in the path of the light source and arranged in use to be driven successively by a set of sub-holograms which together correspond to a holographic image; and light guiding means arranged to guide light output from the EASLM such that the sub-holograms are displayed successively in respective tiled regions of an EASLM projection surface.

The present invention takes advantage of the "memory" which is inherent in the human eye. Providing that the light output corresponding to each sub-hologram is of sufficient amplitude, an observer will remember that sub-hologram at least for the time it takes to display the entire set of sub-holograms making up the sub-holographic image. There is thus no need for an OASLM.

In certain embodiments of the invention, the sub-hologram images appear at the projection surface as though they are illuminated with a plane wave.

Preferably, said light guiding means comprises replicating optics arranged in use to replicate the light output from the EASLM so as to provide multiple images. More preferably, the light guiding means comprises an array of electronically controlled baffles or shutters disposed between the replicating optics and said EASLM projection surface, said baffles/shutters being controlled such that only that baffle/shutter, which is aligned with a tiled region of the EASLM projection surface associated with a given sub-hologram, is open when the EASLM is being driven by that sub-hologram.

Preferably, the light guiding means comprises means disposed at the EASLM projection surface, or between the EASLM and the EASLM projection surface, for causing diverging light to be redirected to provide a plane wave. More preferably, this means comprises an array of lenses or a holographic redirector disposed at or near the EASLM projection surface.

The sub-hologram images on the EASLM projection surface may produce discrete sets of wavefronts which converge on object points.

The light source used to illuminate the EASLM may comprise a single light source, or a plurality of light sources. For example, the light source may be an array of light sources disposed behind the replicating optics such that the EASLM is illuminated at the desired angle of incidence and with a wavefront of the desired form (e.g. plane/converging/diverging).

Preferably, the angle of incidence of the light upon the EASLM depends upon the spatial position, within the hologram, of a sub-hologram currently being displayed, the angle being switched in synchronisation with the sub-hologram update rate of the EASLM. More preferably, the light source comprises an array of light sources disposed between a baffle/shutter array.

According to a second aspect of the present invention there is provided a method of displaying a hologram, the method comprising:

successively driving an Electrically Addressable Spatial Light Modulator (EASLM) with a set of sub-holograms which together correspond to a holographic image;

directing coherent light onto the EASLM; and guiding light output from the EASLM such that the sub-holograms are displayed successively in respective tiled regions of an EASLM projection surface.

According to a third aspect of the present invention there is provided a holographic display comprising:

a light source;

an Electrically Addressable Spatial Light Modulator (EASLM) in the path of the light source and arranged in use to be driven successively by a set of sub-holograms which together correspond to a holographic image;

light guiding means arranged to guide light output from the EASLM such that the sub-holograms are displayed successively in respective tiled regions of an EASLM projection surface; and an array of lenses disposed on the output side of said EASLM projection plane, the lenses of the array being aligned with respective tiled regions.

For a better understanding of the present invention and in order to show how the same may be carried into effect reference will now be made, by way of example, the accompanying drawings, in which:

FIG. 5 illustrates schematically an EASLM illumination process;

FIG. 6 illustrates schematically an alternative EASLM illumination process;

Figure 2:
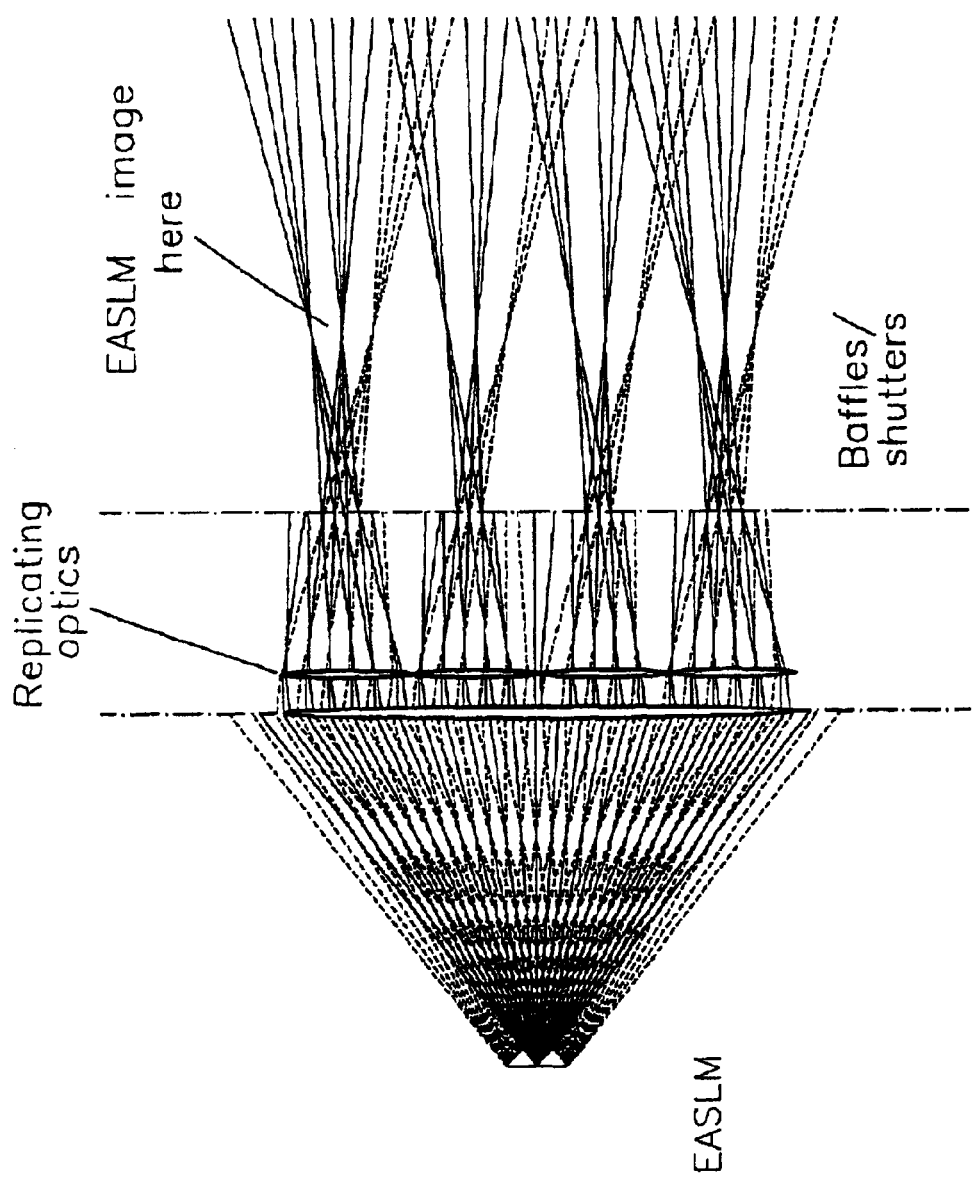
FIG. 2 illustrates EASLM images formed at an EASLM projection surface by illuminating the EASLM with coherent light.

There is illustrated schematically in FIG. 2 an Active Tiling™ holographic display which comprises an Electrically Addressable Spatial Light Modulator (EASLM) arranged to receive holographic image data from a computer (not shown). The EASLM may be for example an acousto-optic modulator which is subdivided into a matrix of modulation elements or an array of liquid crystal elements.

The image data received from the computer comprises a series of sub-holograms or hogels (e.g. parts of a larger hologram, holographic stereograms, or phase added stereograms) each consisting of a matrix of light modulation data: when tiled together, these matrices provide a complete data array defining a hologram. The sub-hologram matrices are passed to the EASLM in a raster-scan like sequence, i.e. row by row. The sub-holographic matrices are mapped in turn to the EASLM modulation elements, with the data (or rather a corresponding voltage) at each matrix point being assigned to a corresponding modulation element. A beam of coherent light, provided as described below, is directed onto the surface of the EASLM. Light reflected from the EASLM is modulated by an amount determined by the voltage applied to the modulation element through which it passes.

Light reflected from the EASLM is directed towards a light guiding system. The light guiding system comprises a first large lens followed by an array of light directing lenses. Disposed in front of the lense array is an array of electronically controlled shutters. The shutter array is aligned with the lens array and is controlled by control signals received from the computer which generates the holographic image data. The control signals are synchronised with the image data provided by the computer to the EASLM, such that only one shutter is open at any one time. In addition, each shutter is open for approximately the duration for which a sub-hologram image is present on the EASLM. The shutters are opened in a raster scan sequence, from left to right and row by row.

Each lens of the lens array is arranged to guide light, transmitted through the shutter with which it is aligned, to a corresponding region (referred to as a "tile") of an EASLM projection surface (in this example, the virtual surface is a planar surface although it could be, for example, spherical or cylindrical). The result of the synchronisation between the switching of the EASLM between sub-holograms, and the opening of the shutters of the array, is that each sub-hologram is projected in turn onto the corresponding tile of the projection surface.

Figure 1:
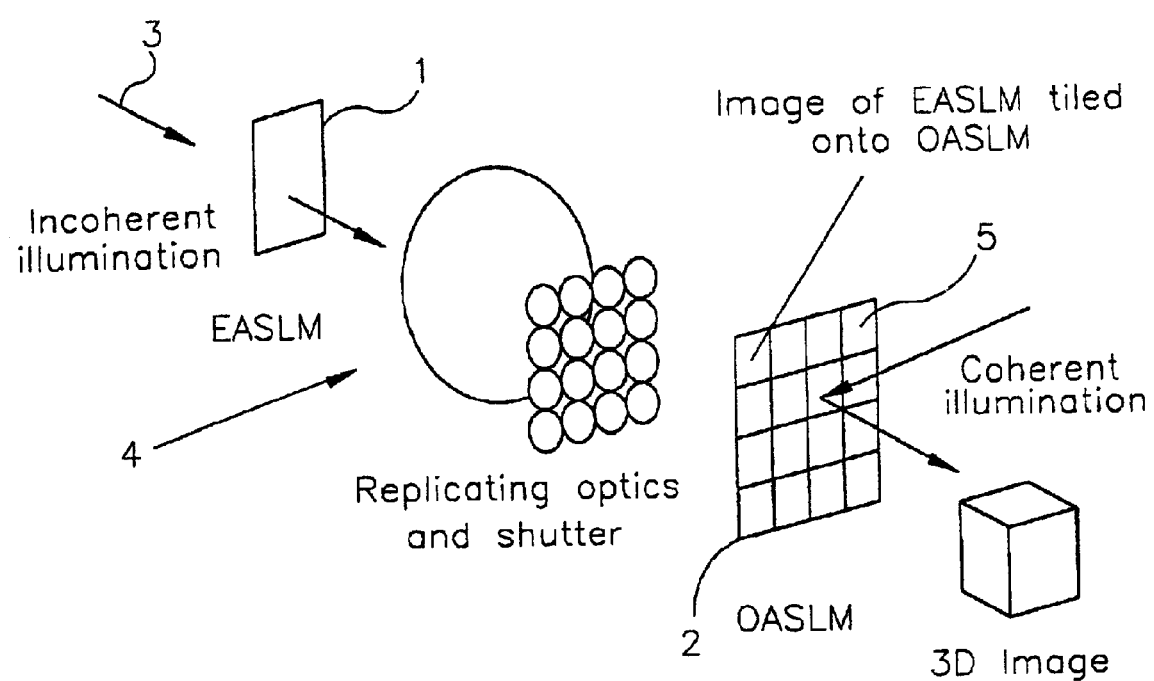
FIG. 1 illustrates an Active Tiling™ holographic display system.

It is well known that the human eye and brain remember an image for a short time after that image has ceased to exist, providing that the intensity of the image is sufficiently great. The greater the intensity of the image, the longer the memory. The display device described here takes advantage of this perceptual memory by displaying a single tile of the projection surface for a time which is less than the total time which it takes to scan the entire hologram. That is to say that at any given time during the scanning process, only a fraction of the tiles may actually be presenting an image. At the end of a frame scan, the eye will perceive the complete image frame, even though only a fraction of the tiles making up that frame are actually displayed at any one time. The OASLM of the prior art (see FIG. 1) becomes unnecessary.

From FIG. 2 it will be appreciated that when the EASLM is illuminated with coherent light and images of coherently illuminated sub-holograms appear at the EASLM projection surface (where the OASLM would have been). The disadvantage of using coherent light however is that greater care is needed over the direction of the illumination—although images of the EASLM appear in the correct positions, it is as though they are illuminated from the wrong angle.

Figure 3:
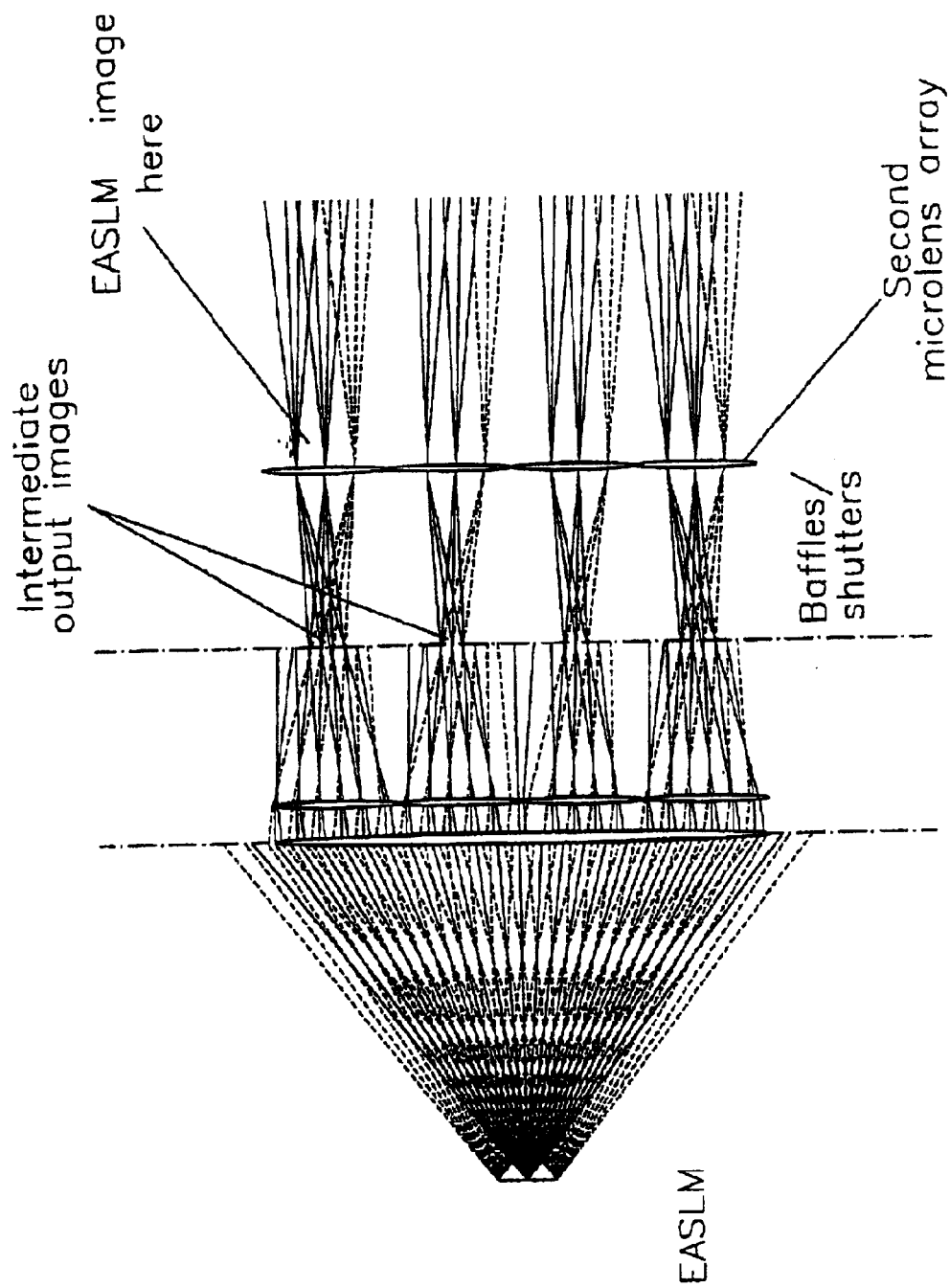
FIG. 3 illustrates EASLM images formed at an EASLM projection surface by illuminating the EASLM with coherent light but where light is redirected at the EASLM projection surface by a microlens array.
Figure 4:
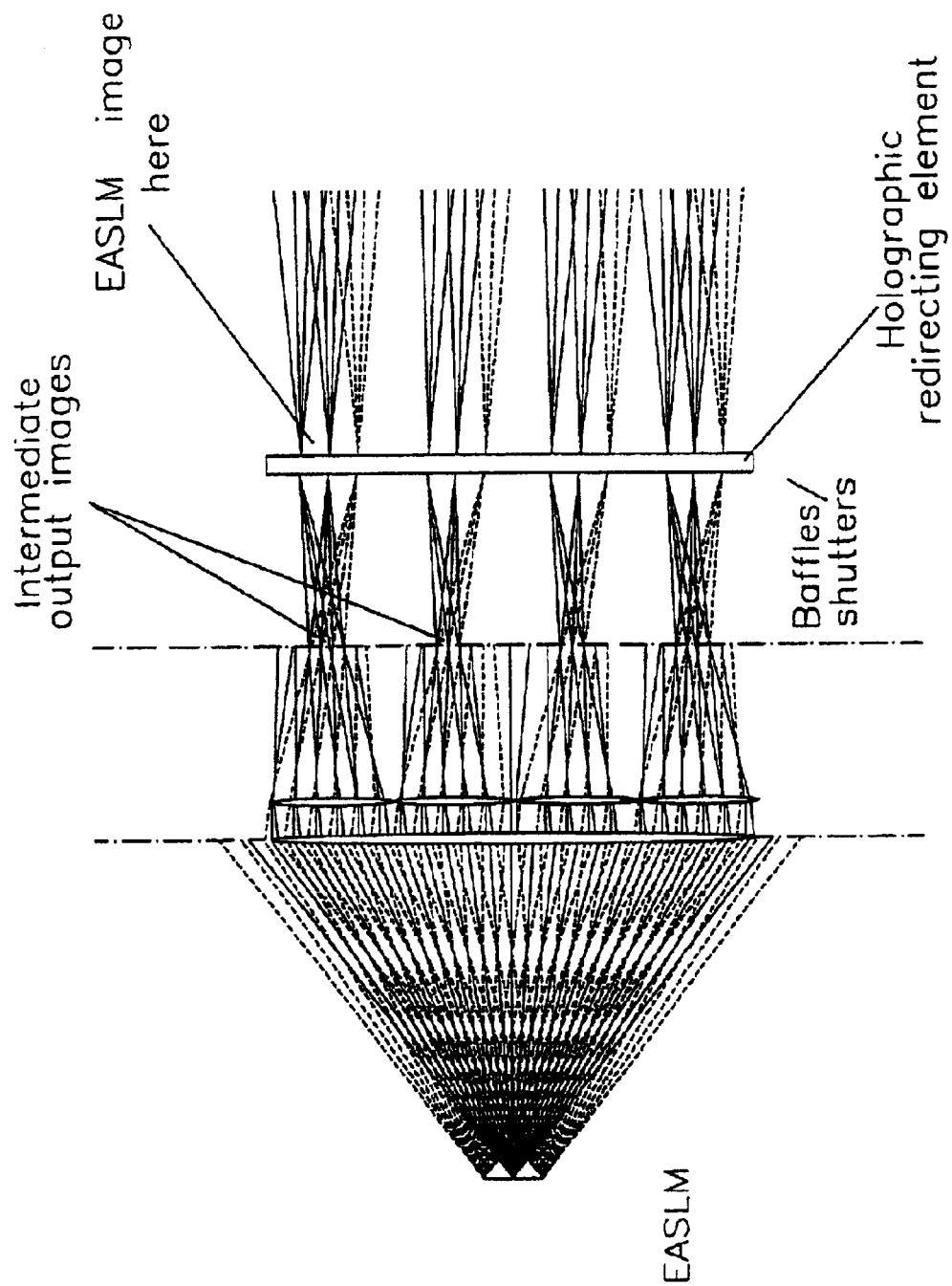
FIG. 4 illustrates EASLM images formed at an EASLM projection surface by illuminating the EASLM with coherent light but where light is redirected at the EASLM projection surface by a holographic redirecting element.

This effect can be corrected by including additional optics in the system. Ray tracing shows that the necessary optic can be a second lens array placed at the projection plane of the EASLM images (FIG. 3). Alternatively, a diffractive or holographic element can be used in place of the microlenses (FIG. 4).

In order to ensure the correct functioning of the display, it is necessary that, for each sub-hologram, the EASLM 1 be illuminated by coherent light at the correct angle. This requires different angles for different sub-holograms. Noting that an intermediate image of the desired 3D object produced by each hogel occurs within the display, the following possibilities will be appreciated.

1) Light contributing to the d.c. spot and conjugate image in this plane can be blocked in the intermediate image plane. This minimises the amount of light passing through the remainder of the system, reducing glare. There is also a significant amount of free space for wires, connectors, etc associated with a shutter array.

2) By exploiting a symmetric lens array (or equivalent holographic redirector), locating a point source at the d.c. spot position for one lens should provide plane wave illumination of the EASLM at the correct angle for the image that passes through the opposite lens. The point source could be provided by a semiconductor laser or optical fibre/waveguide. This yields a potentially compact system.

3) By switching off light sources when they are not required, the amount of unwanted light passing through the system is reduced, again minimising glare. Shutters may still be required to eliminate the higher diffracted orders reflected from the EASLM if they aren't considered weak enough to be insignificant. This will largely depend on the structure of the EASLM pixels.

FIG. 5 illustrates one suitable illumination system where an array of coherent light sources are provided in the plane of the shutter array. FIG. 6 illustrates an alternative system which utilises an external plane wave although it is expected that this would be less efficient.

EASLM image magnification to provide the output display can be achieved by providing an output lens in front of the EASLM projection plane, the lens having an appropriate focal length. Replay optics downstream from the EASLM images can be the same as for a conventional system except that no provision need be made for providing 'OASLM read light illumination'. Alternatively, of course, the second lens array could be used to focus down an externally derived plane wave to give point sources although this would be a less desirable method (see FIG. 6).

If the EASLM 1 is operated in transmission then illumination from the appropriate angles may be achieved by multiple sources or by some switchable optics. It may be beneficial to illuminate the EASLM with a non-plane wave although this is yet to be explored. For example, a converging wave may enable an EASLM with smaller pixels (larger diffraction angle) to be used whilst avoiding vignetting (light rays from regions on the EASLM 1 away from the centre not passing through the replicating optics). Converging wave illumination may be achieved simply by moving the point sources in a direction away from the EASLM.

It is noted that the embodiments described here are particularly suited to holograms composed of "hogels" (a type of sub-hologram). Hogels are described in the article "Holographic Bandwidth Compression Using Spatial Subsampling", M. Lucente, Optical Engineering, Vol. 35, No.6, June 1996. The use of hogels takes into account the finite resolution of the human eye to mininise the information content of the computer generated hologram (resulting in a lower resolution image). Hogels offer a method of computation which is potentially fast.

In essence, each hogel can be envisaged as diffracting beams of light into a number of directions. For each direction there is a corresponding fringe pattern that can be obtained from a look-up table. The brightness of beams in any direction (or indeed whether there is a beam at all) is determined by whether the beam passes through a point on the 3D object and the brightness of the object at that point. The hogel to be displayed is the linear summation of all these fringe patterns, appropriately weighted to provide the required intensity in the image. The resolution of the image is approximately determined by the hogel size, so an attempt is made to match this size to the resolution of the viewer's eyes. This resolution matching is where minimisation of the computation time is expected to be achieved. FIG. 2 illustrates the hogel 3D display principle.

One of the features of the hogel method is that, whilst each hogel needs to be illuminated with coherent light, the hogels can be incoherent with respect to each other. For the purpose of this discussion, the term discrete coherence (not to be confused with partial coherence) will be used to describe this. It is expected that such a discrete coherent display system would have reduced speckle in the image.

It is recognised here that a modified Active Tiling™ system could be particularly suited to provide discrete coherently illuminated hogels. The concept used is that the hogels are illuminated with coherent light, time sequentially, so that at any one time, the eye receives light from only one hogel. The 3D image is built up in the eye as it integrates the light contributions from all the hogels over time. This is an incoherent process. The tiling process of the Active Tiling™ system is, of course, time sequential. The speed of the time sequential illumination would need to be faster than the image latency of the eye (e.g. video frame rates).

It is expected that the hogel images do not need to be perfectly 'butted' together, relaxing optical design constraints. Deliberately overlapping hogels may allow some modification of the image quality (perhaps reducing the perception of hogel boundaries) although this would effectively require a greater number of pixels in the overall display.

Figure 7:
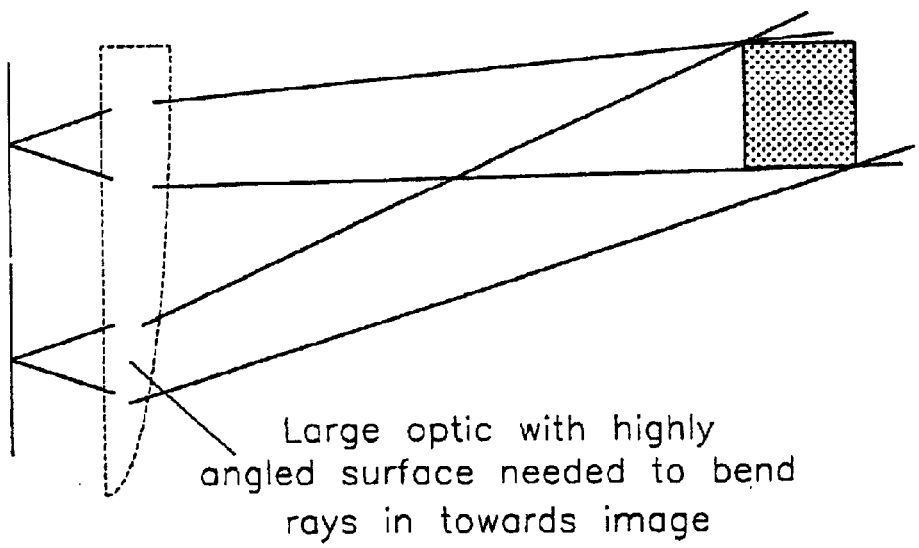
FIG. 7 illustrates schematically a portion of an output section of a conventional holographic display.
Figure 8:
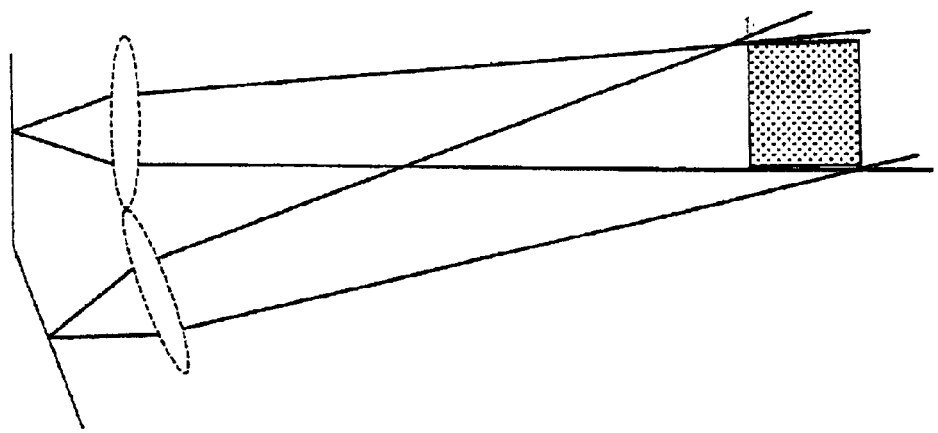
FIG. 8 illustrates schematically a portion of an output section of an improved holographic display.

The discrete coherent nature of the sub-holograms (and in particular of hogels) means that sub-hologram images can be tiled with individual optics, reducing the need for extra large elements. FIG. 7 Schematic illustrates conventional replay optics where a single large lens (only the lower portion of the lens is shown in the Figure) is positioned in front of the EASLM projection surface. FIG. 8 illustrates how the use of tilted EASLM image 'planes' reduces the angle through which the replay optics have to direct the light. This allows the use of thinner, smaller optics.

It will be appreciated by the person of skill in the art that various modifications may be made to the above described embodiments without departing from the scope of the present invention. For example, the device described above may provide a single channel of multi-channel holographic display. That is to say that a number of display devices may be arranged in an array such that the output provides a single hologram.

What is claimed is:

1. A holographic display comprising:
    a source of coherent light;
    an Electrically Addressable Spatial Light Modulator (EASLM) in the path of the light source and arranged in use to display successively a set of sub-holograms which together correspond to a holographic image; and
    light guiding means arranged to guide modulated light output from the EASLM such that the sub-holograms appear successively in respective tiled regions of an EASLM projection surface, characterised in that
        the source of coherent light is arranged to illuminate the EASLM with an angle of incidence which depends upon the spatial position within the hologram of a sub-hologram being displayed, the angle being switched in synchronisation with the sub-hologram update rate of the EASLM.

2. A display according to claim 1, wherein said light guiding means comprises replicating optics arranged in use to replicate the light output from the EASLM so as to provide multiple images.

3. A display according to claim 2, wherein the light guiding means comprises an array of electronically controlled shutters disposed between the replicating optics and said EASLM projection surface, said shutters being controlled such that only that shutter, which is aligned with a tiled region of the EASLM projection surface associated with a given sub-hologram, is open when the EASLM is being driven by that sub-hologram.

4. A display according to claim 1, wherein the light guiding means comprises means disposed at the EASLM projection surface, or between the EASLM and the EASLM projection surface, for causing the apparent diverging light illumination of the EASLM images to be redirected to appear to be a plane wave or other wavefront illumination.

5. A display according to claim 4, wherein said means causing diverging light to be redirected to provide an apparent wavefront illumination comprises an array of lenses or a holographic redirector disposed at or near the EASLM projection surface.

6. A display according to claim 1, wherein the light source used to illuminate the EASLM comprises a single light source, or a plurality of light sources.

7. A display according to claim 6, wherein the light source comprises an array of light sources disposed behind the replicating optics.

8. A display according to claim 1, wherein baffles are positioned in an intermediate Image plane so that light associated with the d.c. spot and conjugate image is blocked.

9. A hole display according to claim 1, wherein:
an array of lenses are disposed an the output side of said EASLM projection plane, the lenses of the array being aligned with respective tiled regions.

10. A holographic display comprising a plurality of displays according to claim 9, the displays being combined to enable a holographic image to be displayed with a large number of pixels.

11. A method of displaying a hologram, the method comprising:

successively displaying on an Electrically Addressable Spatial Light Modulator (EASLM) a set of sub-holograms which together correspond to a holographic image;

directing coherent light onto the EASLM; and guiding modulated light output from the EASLM such that the sub-holograms are displayed successively in respective tiled regions of an EASLM projection surface, characterised by the steps of illuminating the EASLM with said source of coherent light at an angle of incidence which depends upon the spatial position within the hologram of a sub-hologram being displayed, and switching the angle in synchronisation with the sub-hologram update rate of the EASLM.

\* \* \* \* \*